(12) United States Patent
Wang et al.

(10) Patent No.: US 9,432,702 B2
(45) Date of Patent: Aug. 30, 2016

(54) SYSTEM AND METHOD FOR VIDEO PROGRAM RECOGNITION

(71) Applicant: TCL RESEARCH AMERICA INC., Santa Clara, CA (US)

(72) Inventors: Haohong Wang, Santa Clara, CA (US); Xiaobo Ren, Santa Clara, CA (US); Yimin Yang, Santa Clara, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 14/325,004

(22) Filed: Jul. 7, 2014

(65) Prior Publication Data

US 2016/0007058 A1 Jan. 7, 2016

(51) Int. Cl.
| | |
|---|---|
| *H04N 7/16* | (2011.01) |
| *H04N 21/234* | (2011.01) |
| *G06K 9/46* | (2006.01) |
| *G06K 9/62* | (2006.01) |
| *H04N 21/414* | (2011.01) |
| *H04N 21/4223* | (2011.01) |
| *H04N 21/41* | (2011.01) |
| *H04N 21/845* | (2011.01) |
| *H04N 5/76* | (2006.01) |
| *H04N 21/4147* | (2011.01) |
| *H04N 21/433* | (2011.01) |
| *H04N 21/438* | (2011.01) |

(52) U.S. Cl.
CPC .......... *H04N 21/23418* (2013.01); *G06K 9/46* (2013.01); *G06K 9/6201* (2013.01); *H04N 5/76* (2013.01); *H04N 21/4122* (2013.01); *H04N 21/4147* (2013.01); *H04N 21/41407* (2013.01); *H04N 21/4223* (2013.01); *H04N 21/4334* (2013.01); *H04N 21/4383* (2013.01); *H04N 21/8453* (2013.01); *G06T 2207/10016* (2013.01)

(58) Field of Classification Search
None
See application file for complete search history.

(56) References Cited

U.S. PATENT DOCUMENTS

| | | | | | |
|---|---|---|---|---|---|
| 5,805,763 | A | * | 9/1998 | Lawler | H04N 5/44543 348/E5.105 |
| 6,133,909 | A | * | 10/2000 | Schein | H04N 5/44543 348/E5.105 |
| 6,169,747 | B1 | * | 1/2001 | Sartain | H04N 21/23406 341/61 |
| 6,240,555 | B1 | * | 5/2001 | Shoff | H04N 5/44543 348/E5.104 |

(Continued)

FOREIGN PATENT DOCUMENTS

| | | |
|---|---|---|
| CN | 102892031 A | 1/2013 |
| CN | 202998337 U | 6/2013 |

*Primary Examiner* — Nicholas Corbo
(74) *Attorney, Agent, or Firm* — Anova Law Group, PLLC

(57) ABSTRACT

A method for video program recognition includes recording video sequences of each of a plurality of channels and obtaining a set of features of an image captured by a user device. The method also includes performing a camera registration operation on the video sequences to select video frames representing the recorded video sequences based on key video frames from a registered cameras associated with the recorded video sequences. Further, the method includes extracting features of at least some of the selected plurality of video frames of each channel, storing the extracted features, and comparing the obtained set of features with the stored features of each channel to determine whether there is a match between the obtained set of features of the image and features of a video frame from a specific channel and, when there is a match, determining the specific channel as a recognized channel number.

18 Claims, 7 Drawing Sheets

(56) References Cited

U.S. PATENT DOCUMENTS

| | | | | |
|---|---|---|---|---|
| 6,323,911 | B1* | 11/2001 | Schein | G06F 3/0481 348/552 |
| 6,889,384 | B1* | 5/2005 | Soloff | H04N 5/445 348/E5.099 |
| 8,122,094 | B1* | 2/2012 | Kotab | H04N 21/2747 706/52 |
| 8,528,019 | B1* | 9/2013 | Dimitrova | G06F 17/30787 382/111 |
| 8,949,910 | B2* | 2/2015 | Meredith | H04L 65/1016 725/37 |
| 2002/0059596 | A1* | 5/2002 | Sano et al. | 725/39 |
| 2003/0093794 | A1* | 5/2003 | Thomas | G06F 17/30017 725/46 |
| 2004/0031049 | A1* | 2/2004 | Suzuki | H04H 20/28 725/39 |
| 2004/0139465 | A1* | 7/2004 | Matthews, III | H04N 5/44543 725/51 |
| 2005/0132420 | A1* | 6/2005 | Howard | G06F 3/017 725/135 |
| 2006/0221232 | A1* | 10/2006 | Yu et al. | 348/449 |
| 2007/0172155 | A1* | 7/2007 | Guckenberger | G06F 17/30247 382/305 |
| 2007/0220540 | A1* | 9/2007 | Walker | G06Q 30/02 725/14 |
| 2007/0277214 | A1* | 11/2007 | Kim | H04N 5/44591 725/131 |
| 2007/0286463 | A1* | 12/2007 | Ritzau | G06K 9/228 382/118 |
| 2008/0052751 | A1* | 2/2008 | Cromarty | H04L 29/06027 725/113 |
| 2008/0082426 | A1* | 4/2008 | Gokturk | G06F 17/30256 705/26.62 |
| 2008/0098432 | A1* | 4/2008 | Hardacker | H04N 7/163 725/51 |
| 2008/0225826 | A1* | 9/2008 | Gentric | H04N 7/52 370/350 |
| 2008/0244675 | A1* | 10/2008 | Sako | H04N 21/6582 725/114 |
| 2009/0083808 | A1* | 3/2009 | Morrison | H04N 7/17336 725/87 |
| 2009/0119701 | A1* | 5/2009 | Aldrey | H04N 5/76 725/32 |
| 2010/0067750 | A1* | 3/2010 | Matsuo | G06F 17/30265 382/118 |
| 2010/0083317 | A1* | 4/2010 | Inagaki | H04N 5/44591 725/44 |
| 2010/0107189 | A1* | 4/2010 | Steelberg | G06Q 30/02 725/32 |
| 2010/0251299 | A1* | 9/2010 | Scott | H04N 5/44543 725/39 |
| 2011/0055347 | A1* | 3/2011 | Hu | H04N 21/21805 709/217 |
| 2011/0107370 | A1* | 5/2011 | Cassanova | H04N 21/4126 725/38 |
| 2011/0311095 | A1* | 12/2011 | Archer | G06K 9/00744 382/100 |
| 2012/0213426 | A1* | 8/2012 | Fei-Fei et al. | 382/159 |
| 2013/0336588 | A1* | 12/2013 | Rane et al. | 382/197 |

* cited by examiner

SYSTEM AND METHOD FOR VIDEO PROGRAM RECOGNITION

FIELD OF THE INVENTION

The present invention relates to the field of video processing technology and, more particularly, to video systems and methods for recognizing video program using a mobile device.

BACKGROUND

With the development of the Internet and video delivery technologies, currently video has been a significant part of the Internet traffic. Also, people are used to multi-screen experiences when watching videos. For example, nearly half of US population use smart phones when watching TV, and it is observed that 47% of users use mobile phones to engage in TV related activities.

However, the human interaction with video is still quite limited due to the complexity of video structure. That is to say, the interactions between mobile phones and TVs are still quite limited. With existing technology, the mobile phone can be used to identify products, CDs, books, and other print media, but it is difficult or impractical for such mobile phone applications in the video area that deals with high-volume data.

For example, considering a TV program with 200 channels, that is, the throughput of the program is 6000 frames per second. If a 10-minute lagging period is allowed, the system needs to be able to recognize 3.6 Million pictures (=6000×10×60) with very low latency. Hence, the difficulty is twofold: high throughput to handle, and large image database for content recognition. Typically, the content recognition involves high computation amount, but the computation is generally related to the number of frames involved in classification/recognition. The more frames involved, the higher classification/recognition accuracy, but also higher amount of computation.

The disclosed methods and systems are directed to solve one or more problems set forth above and other problems.

BRIEF SUMMARY OF THE DISCLOSURE

One aspect of the present disclosure includes a method for video program recognition on a server system. The method includes recording video sequences of each of a plurality of channels and obtaining a set of features of an image captured by a first user device of a video frame from one of the plurality of channels and played on a second user device different from the first user device. The method also includes performing a camera registration operation on the video sequences of each of the plurality of channels to select a plurality of video frames representing the recorded video sequences of each of the plurality of channels based on key video frames from a plurality of registered cameras associated with the recorded video sequences. Further, the method includes extracting features of at least some of the selected plurality of video frames of each of the plurality of channels, and storing the extracted features of each of the plurality of channels. The method also includes comparing the obtained set of features of the image with the stored features of each of the plurality of channels using an image classifier to determine whether there is a match between the obtained set of features of the image and features of a video frame from a specific channel and, when there is a match between the obtained set of features of the image and features of a video frame from a specific channel, determining a channel number of the specific channel as a recognized channel number.

Another aspect of the present disclosure includes a video program recognition system. The system includes a recorder module, an image classifier module, a camera registration module, a feature extraction module, a feature extraction module, and a feature database. The recorder module is configured to record video sequences of each of a plurality of channels. The image classifier module is configured to obtain a set of features of an image captured by a first user device of a video frame from one of the plurality of channels and played on a second user device different from the first user device. Further, the camera registration module is configured to perform a camera registration operation on the video sequences of each of the plurality of channels to select a plurality of video frames representing the recorded video sequences of each of the plurality of channels based on key video frames from a plurality of registered cameras associated with the recorded video sequences. The feature extraction module is configured to extract features of at least some of the selected plurality of video frames of each of the plurality of channels, and the feature database configured to store the extracted features of each of the plurality of channels. Further, the image classifier is configured to compare the obtained set of features of the image with the stored features of each of the plurality of channels to determine whether there is a match between the obtained set of features of the image and features of a video frame from a specific channel and, when there is a match between the obtained set of features of the image and features of a video frame from a specific channel, to determine a channel number of the specific channel as a recognized channel number.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
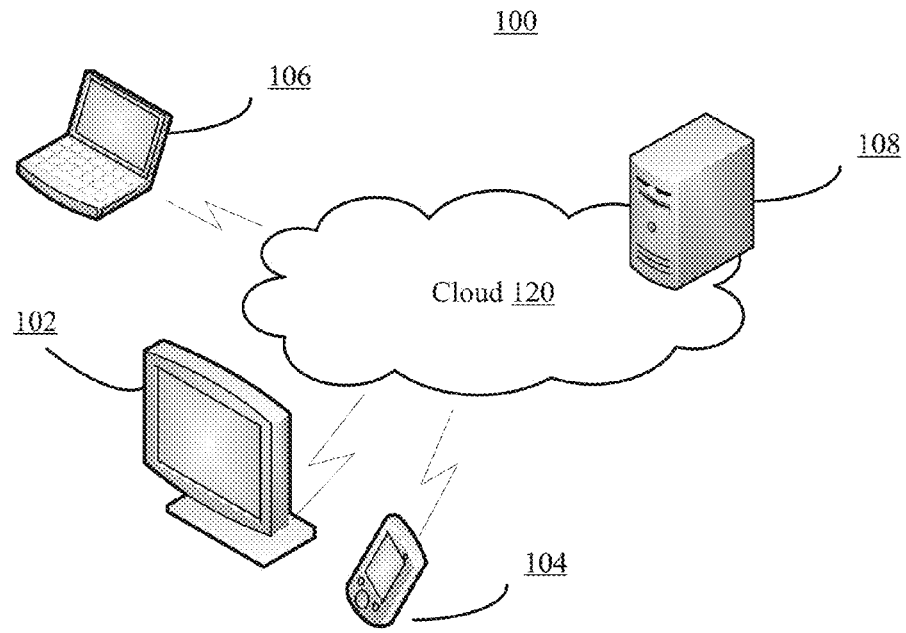
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a mobile device 104, a notebook computer 106, a cloud or network 120, and a server 108. Certain devices may be omitted and other devices may be added.

TV 102 may include any appropriate type of TV, such as plasma TV, LCD TV, projection TV, non-smart TV, smart TV, or mobile TV. TV 102 may also include any devices that with display functionality. Mobile device 104 may include any appropriate type of mobile computing device, such as a mobile phone, a smart phone, a tablet, and a digital personal assistant (PDA). Notebook computer 106 may include any appropriate type of computer, such as laptop computer or other type of personal computer. TV 102, mobile device 104, and notebook computer 106 may be considered user devices of multi-screens in certain multi-screen applications. Any number and other types of user devices may be included.

Server 108 may include any appropriate type of server computer or computers providing server functionalities. Cloud 120 may include any number of servers connected via a computer network, such as the Internet, to provide services to devices connected to the cloud 120. Server 108 may be a part of cloud 120, and server 108 and cloud 120 may be used interchangeably with respect to certain functionalities or services provided by the cloud 120. Optionally, a traditional client-server architecture may be used, and cloud 120 may simply be referred as a computer network, such as the Internet.

Figure 2:
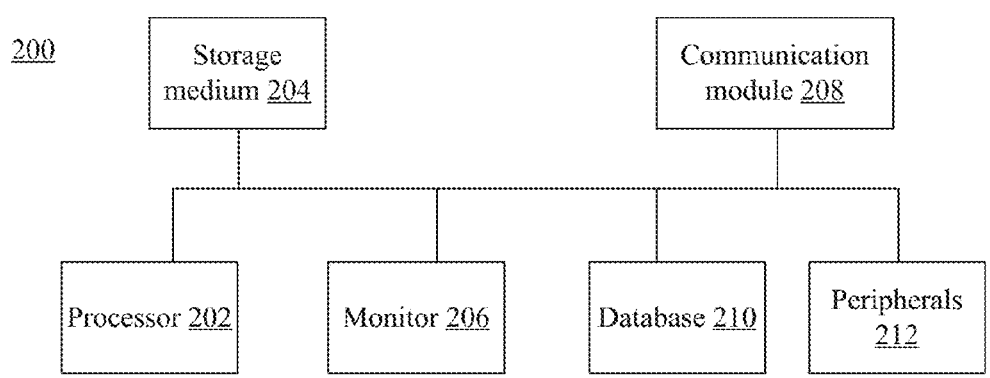
FIG. 2 illustrates an exemplary computing system consistent with the disclosed embodiments.

FIG. 2 shows a block diagram of an exemplary computing system 200 capable of implementing TV 102, mobile device 104, notebook computer 106, and/or server 108. As shown in FIG. 2, computing system 200 may include a processor 202, a storage medium 204, a monitor 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching. Particularly, when computing system 200 implements the mobile device 104, peripherals 212 may also include a camera for capturing photo images for the mobile device 104.

Figure 3:
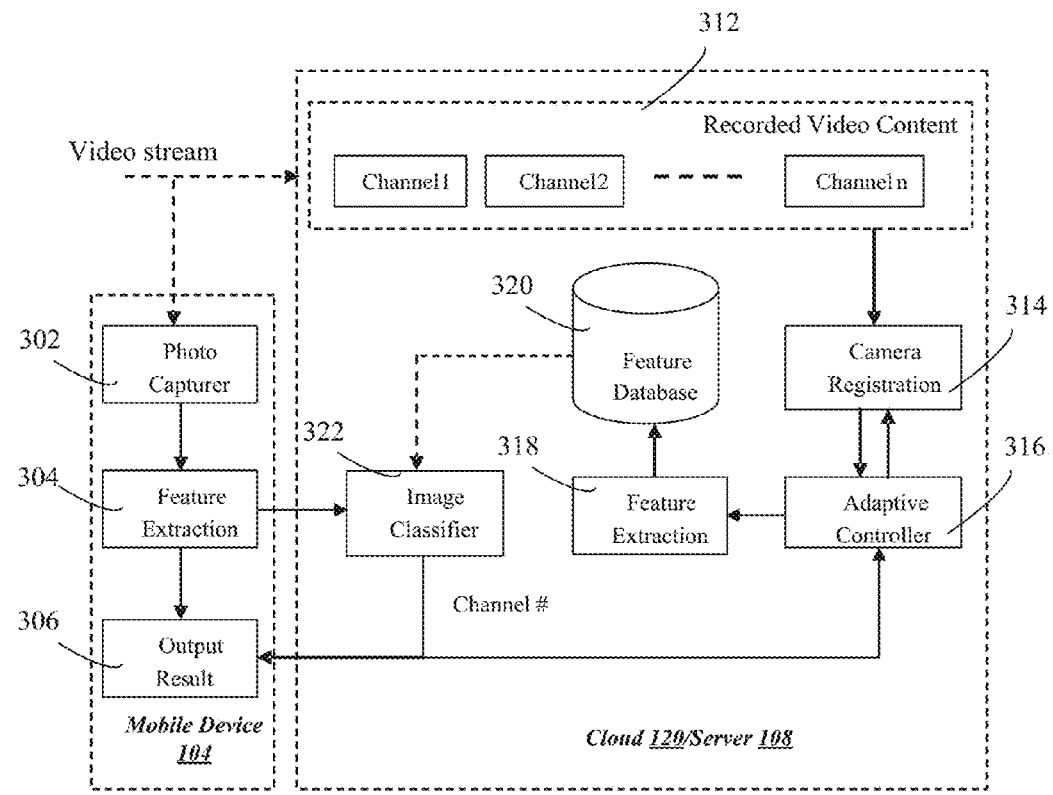
FIG. 3 illustrates an exemplary video program recognition system consistent with the disclosed embodiments.

In operation, the mobile device 104 and/or the cloud 120/server 108 may perform a video recognition process in a multi-screen application. FIG. 3 illustrates an exemplary video program recognition system consistent with the disclosed embodiments.

As shown in FIG. 3, for illustrative purposes, mobile device 104 may include a photo capturer module 302, a feature extraction module 304, and an output module 306 for outputting video recognition results. The cloud 120 may include a recorder module 312 for recording video content, a camera registration module 314, an adaptive controller 316, a feature extraction module 318, an image classifier 322, and a video feature database 320. Certain components may be omitted and other components may be added.

Figure 4:
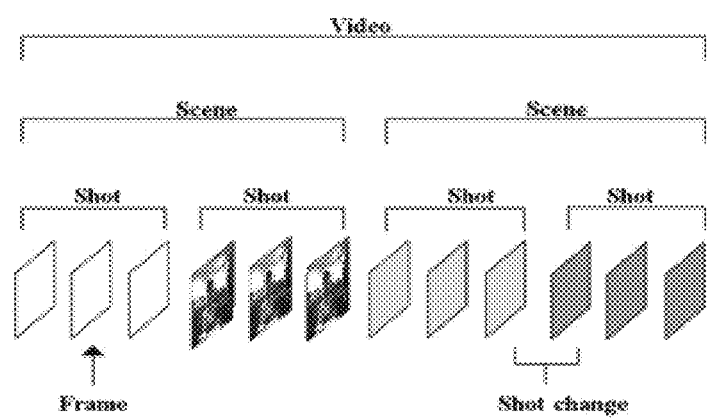
FIG. 4 illustrates an exemplary video structure consistent with the disclosed embodiments.

In operation, a video stream may be provided to one or more user devices and cloud 120. For example, a broadcasting system may be streaming video as a subscription service over the Internet. A video stream may be divided into different video components. As shown in FIG. 4, a video stream may be divided into scenes, a scene may be divided into shots, and a shot may be divided into frames, as. The frame can be further divided into objects and features of the video frame may be extracted for further processing.

A user device (e.g., a TV, PC, laptop, Pad, or mobile device, etc.) may playback the video. The video in playback may be displayed on a screen of the user device. Further, referring to FIG. 3, the mobile device 104 may capture a video frame using the photo capturer. For example, the mobile device 104 may capture a video frame from the screen of the user device using a camera. That is, the camera may take a snapshot of the screen to capture the video frame. Optionally, other methods of capturing the video frame may also be used.

Further, the mobile device 104 may extract features of the video frame. That is, the mobile device 104 may extract certain characteristics from the video frame for image classification. The extracted feature set may be provided to cloud 120 or, more specifically, to the image classifier of the cloud 120.

At the same time, the cloud 120 may record a number of channels of the broadcasting streaming video (channel 1, channel 2, . . . , channel n) using the recorder module. The recording of the channels of the broadcast may be set for a predetermined time period, such as 1 minutes, 5 minutes, 10 minutes, or other time values. The recording may be used for video program recognition or other purposes.

Further, the cloud 120 may perform a camera registration operation on the recorded video frames. Camera registration, as used herein, may refer to registration of different cameras capturing video frames in a video sequence/stream. The concept of camera registration is based on the camera takes in reconstruction of video edits. A typical video sequence is an interleaved format of a number of camera shots, and a camera take is a continuous recorded performance with a given camera setup. By registering each camera from the incoming video frames, the original interleaved format can be separated into a number of sequences with each corresponding to a registered camera that is aligned to the original camera setup.

After the camera registration operation by the camera registration module, the near-duplicated images in the same camera take may be ignored, reducing the throughput while maintain an acceptable recognition accuracy. That is, the camera registration module may be configured to register certain different camera takes in the video frames to simplify the video frames and to provide the simplified video frames for next step of processing.

The simplified video frames are then processed by feature extraction module in cloud 120, with an addition of the adaptive controller providing a computational adaptive flow control mechanism to maintain the video processing flow in a stable condition.

The cloud 120 may then perform feature extraction of the video frames from the camera registration module using the feature extraction module. The feature extraction module of the cloud 120 may use a same feature extraction algorithm as the feature extraction module of the mobile device 104. That is, the output representation and/or calculation algorithm may be the same for both feature extraction modules in the cloud 120 and in the mobile device 104. The detailed implementations for both feature extraction modules in the cloud 120 and in the mobile device 104 may be different, or may be same, depending on specific applications.

The extracted features of the video frames from the various channels may then be stored in the feature database. The feature database may include any appropriate commercial or customized database, or any appropriate storage specifically configured for image retrieval.

Further, the image classifier compares the feature set submitted from the mobile device 104 with features from the feature database to determine whether the feature set from the mobile device 104 matches any feature set provided by the cloud 120 from a particular channel. If the image classifier determines a match, the particular channel is recognized, and the particular channel number is provided to the mobile device 104, which may also generate video recognition results by the output module. The channel number is also feedback to the adaptive controller module to improve the performance of the adaptive controller.

The adaptive controller may control the video frame processing based on certain predetermined algorithms. For example, the adaptive controller may determine which frame is to be dropped and which frame goes to the next step of processing (i.e., feature extraction). That is, the adaptive controller may control the throughput of the video frame processing such that the accuracy of video recognition and the computation amount may be balanced to reach a desired implementation. For example, the adaptive controller may control the camera registration module to reduce the high throughput of multiple video channels (e.g., 6000 fps) to a lower throughput that matches the computational capacity of the feature extraction module (e.g., 60 fps).

Figure 5:
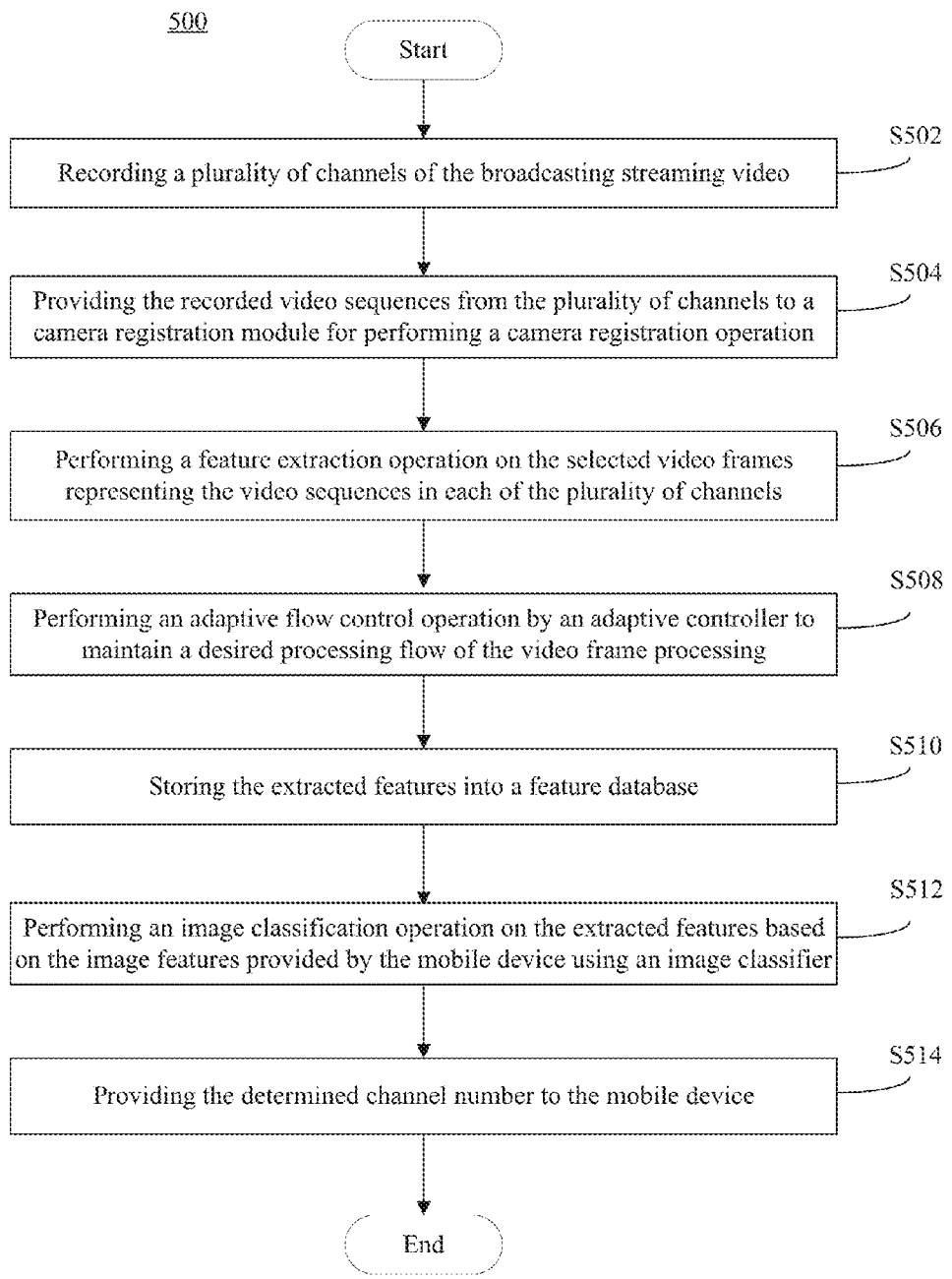
FIG. 5 illustrates an exemplary operating process consistent with the disclosed embodiments.

More specifically, FIG. 5 illustrates an exemplary operating process of the cloud 120/server 108. As shown in FIG. 5, at beginning, the server 108 (e.g., processor 202) may cause a recorder module to record a plurality of channels of the broadcasting streaming video (channel 1, channel 2, . . . , channel n) using the recorder module (S502).

Further, the recorded video sequences from the plurality of channels are provided to a camera registration module for performing a camera registration operation (S504).

Figure 6:
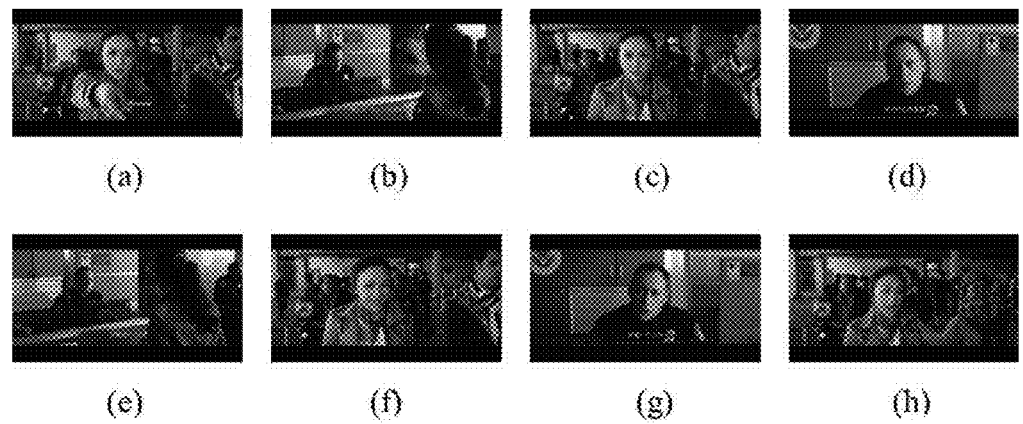
FIG. 6 illustrates an example of camera take editing results from a movie.

A camera take is a series of consecutive frames taken by a camera. It can be cut into a sequence of segments and interleaved with other camera takes to form a scene which completes an event or a story in a video sequence. FIG. 6 shows an example of camera take editing results from a movie. Each picture in the FIG. 6 is a key frame selected from a shot of the video scene, thus frames (a) to (h) represent consecutive shots, composing a scene.

Further, frames (a), (c) and (f) are from the same camera take, frames (b) and (e) are from the same camera take, and frames (d) and (g) are from the same camera take. Thus, the shots from the same camera take can be grouped together and represented by one or more frames. The number of video frames need to be processed can be substantially reduced and the throughput for further processing can also be reduced.

Figure 7:
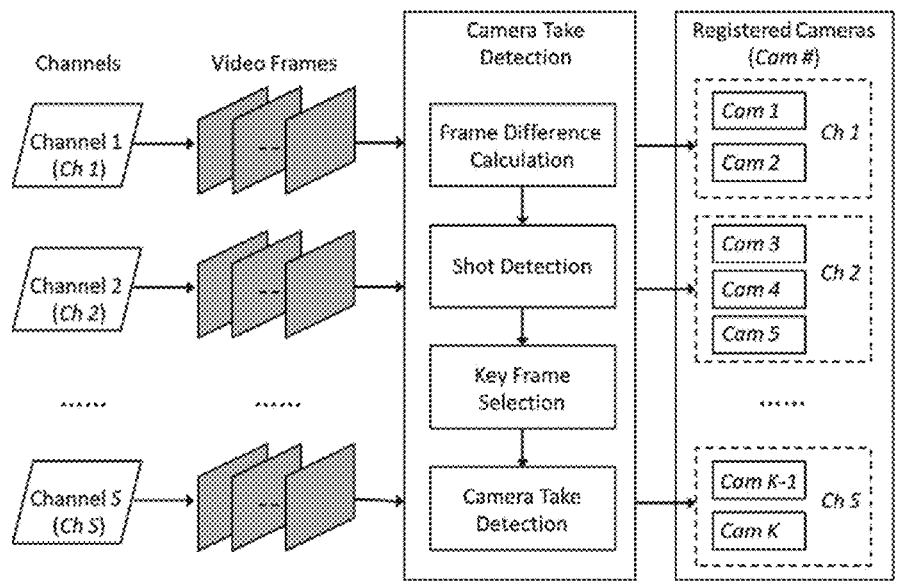
FIG. 7 illustrates exemplary camera take detection and registration consistent with the disclosed embodiments.

To perform the camera registration operation, the server (e.g., the camera registration module) detects and maintains camera takes for each channel. The detected and maintained camera take can form a registered camera pool. That is, each channel follows the same procedure of camera take detection and contributes to the registered cameras pool. Specifically, as shown in FIG. 7, for each channel (Channel 1, Channel 2, . . . , Channel S), it may take following steps for camera take detection.

Frame difference calculation: based on the assumption that two consecutive frames in a video shot should have high similarity in terms of visual content, the frame difference is calculated using a similarity indicator, such as a color histogram (or raw pixel values for saving computational cost), as a measurement of similarity between two frames. Optionally, a plurality of similarity calculation algorithms may be implemented with different computational complexity and computation speeds.

Shot detection: if the frame difference is above a preset threshold value, then a new shot is detected. The selection of the threshold, if not selected properly, may cause over segmentation or down segmentation depending on the types of video programs (e.g., action, or drama, etc.). To determine a proper threshold value and further refine the detection results, certain constraints may apply, such as video shot duration, i.e., the detection of the shot has to be within the constraint.

Key frame selection: a key frame is selected to represent the visual content of a shot using a predetermined algorithm. For example, the first frame of a shot is selected as the key frame for later processing. Other methods may also be used to select (or generate) the most representative key frame(s).

Camera take detection: each detected shot (represented by a key frame) may be matched with the last shot in each detected camera take based on predetermined matching criteria. If the matching criterion is satisfied, then the current shot is added to the end of the matched camera take. Such operation may be based on the assumption that a shot is most related to the one with closest temporal relationship.

Initially, within a certain time period, the first shot may be used as a camera take. In addition, a camera retirement strategy may be used. That is, after a certain period time that a camera take has no matched image, the camera is consider "retried" and removed from the list of registered cameras. As shown in FIG. 7, camera take detection is performed video frames from individual channels, and after the camera registration operation, channel 1 has registered cameras cam 1 and cam 2, channel 2 has registered cameras cam 3, cam 4, and cam 5, . . . , and channel S has registered cam k-1 and cam k.

Figure 8:
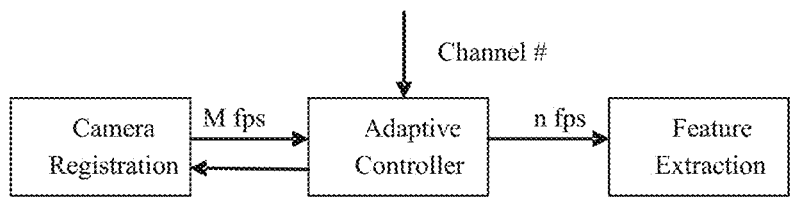
FIG. 8 illustrates an exemplary flow control operation of an adaptive controller consistent with the disclosed embodiments.

Returning to FIG. 5, after performing the camera registration operation (S504), a feature extraction operation is performed on the selected video frames representing the video sequences in each of the plurality of channels (S506). Further, an adaptive flow control operation may be performed by an adaptive controller to maintain a desired processing flow of the video frame processing and to interact with the camera registration operation to select frames for further processing (S508). FIG. 8 illustrates an exemplary flow control operation of the adaptive controller.

As shown in FIG. 8, the adaptive controller may receive M fps (frame-per-second) input image candidates (i.e., video frames) from the camera registration module and selects n fps winners for further processing (M and n are integers and M>>n). The adaptive controller may also drop the unselected video frames by interacting with the camera registration module.

The camera registration module may receive the selection outcome (e.g., n fps) of the adaptive controller and updates its data and/or algorithm. For example, the camera registration module may maintain a list of K live cameras (K is a changing integer) for the S channels, and each channel may have more than one associated live cameras, and M=30S if the video stream runs 30 frame per second).

Figure 9:
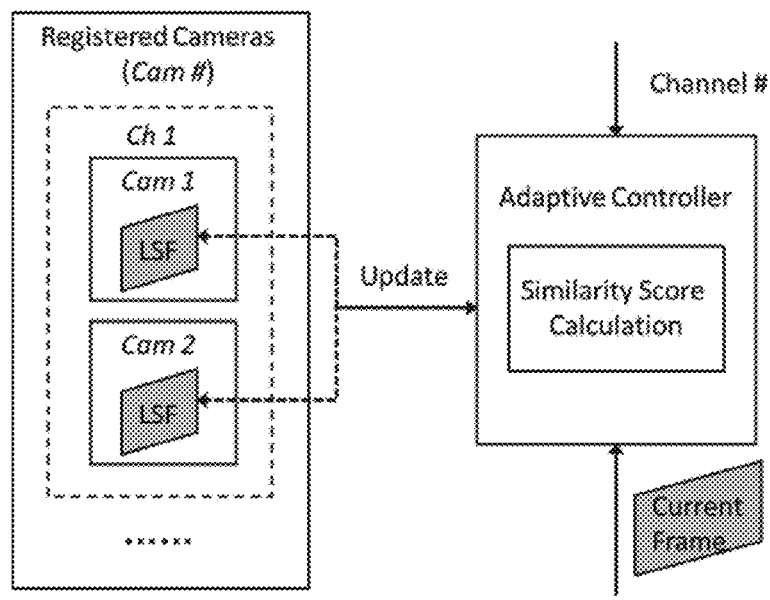
FIG. 9 illustrates an exemplary interaction between an adaptive controller and a camera registration module consistent with the disclosed embodiments.

For each camera, there is a last selected frame recorded, so that the current frame can be compared to generate a similarity score. Once a frame is selected by the adaptive controller, the camera registration module may replace the last selected frame with the selected frame for the associated camera. FIG. 9 illustrates an exemplary interaction between the adaptive controller and the camera registration module.

As shown in FIG. 9, the camera registration module interacts with the adaptive control module for selecting a reference frame. Using one channel (Channel 1) as an example, the adaptive controller receives the channel recognition results (recognized channel number) and calculates the similarity score of a current frame with the last selected frame (LSF) of each camera take. The LSF with a highest score is then replaced by the current frame.

In addition, a flow control mechanism may be implemented inside the camera registration module. For example, the camera registration module may include a plurality of implementations of algorithms for frame detection and selection with different precision and computation speed, from a lowest precision but fastest speed to a highest precision but lowest speed. Server 108 may manage buffers for input frames to the camera registration module and provide the buffer fullness to the camera registration module. Based on the buffer fullness, the camera registration module may select a specific implementation with the precision and computation speed matching the video frame flow.

For example, if the buffer is close to completely full, i.e., a processing congestion condition, which means the processing speed needs to be accelerated, the camera registration module may dynamically switch to a simpler implementation with lower precision but faster computation speed. On the other hand, if the buffer is close to empty, a processing non-congestion condition, which means the processing speed can be slowed down, the camera registration module may switch to a more complex implementation with higher precision but slower computation speed. The number of the implementations may be configured in advance or in real-time depending on specific applications.

Returning to FIG. 8, in addition to the interaction with the camera registration module, the adaptive controller may also receive the selected channel number (i.e., the result) as a feedback from the mobile device 104.

Thus, the problem for the adaptive controller to solve may be similar to a Knapsack problem, i.e., selecting n objects from a bag of M objects. Specifically, the nature logic of such selection is based on the followings.

For channels that no one cares (i.e., no inquires), the priority for selection can be low. That is, the user preference of channels may be considered as an indication of selection priority. If the user(s) does not make any inquires on a particular channel, it can mean that such channel is less likely to be selected.

For an existing camera, if the similarity between the current frame and the last selected frame gets low, then priority of selection can be raised. For a new camera added by the camera registration module, the priority of selection is high. Further, for a channel without any selection for a certain time period, the priority for selection gets high.

Provided that $I_s$ denotes the number of inquiries of channel s (s=1, 2, ..., S) within a short recent period T (e.g., 10 seconds), $L_s$ denotes the number of inquiries of channel s (s=1, 2, ..., S) within a longer recent period (e.g., 5 minutes), f denotes the current frame in examination, C(f) denotes its associated channel of the current frame in examination, Sim(f) denotes the similarity score between f and last selected frame of C(f) (if the last selected frame does not exist, then Sim(f)=0), t(f) denotes the time period that the channel of f has no new frame selection, then the score for current frame is obtained by:

$$W(f) = \begin{cases} \dfrac{1.0 - Sim(f)}{\beta + e^{\alpha I_{C(f)} + (1-\alpha)L_{C(f)}}} & \text{if } t(f) < T \\ 1.0 & \text{otherwise} \end{cases}$$

where $\alpha$ and $\beta$ are parameters to be trained ahead of time, and the impact of channel inquires is modeled with a power function. By ranking the scores of incoming frames, the adaptive controller selects the frames with highest scores for further processing.

Returning to FIG. 5, after the flow control operation and features of selected video frames are extracted, the extracted features are stored into a feature database (S510).

The extracted features may be divided into two categories, global features and local features. Global features include those features that describe an entire image. Most shape and texture descriptors fall into this category. On the other hand, local features include descriptors of local image neighborhoods computed at multiple interest points. The feature database may store global features and local features separately for efficient retrieval.

Further, an image classification operation may be performed on the extracted features based on the image features provided by the mobile device using an image classifier (S512). The image classifier may compare the provided features with the extracted features to determine whether there is a match. If there is a match, the channel of the extracted features can be determined.

In addition, a flow control mechanism may be implemented inside the image classifier module. For example, the image classifier may include two types of classifications, one for high throughput situations, e.g., buffer being close to full, and the other for low throughput situations, e.g., buffer being close to empty, and may dynamically chooses between the two.

More particularly, the high-throughput classification may use a low-complexity algorithm using global features, and the low-throughput classification may use a high-complexity algorithm using local features.

Figure 10:
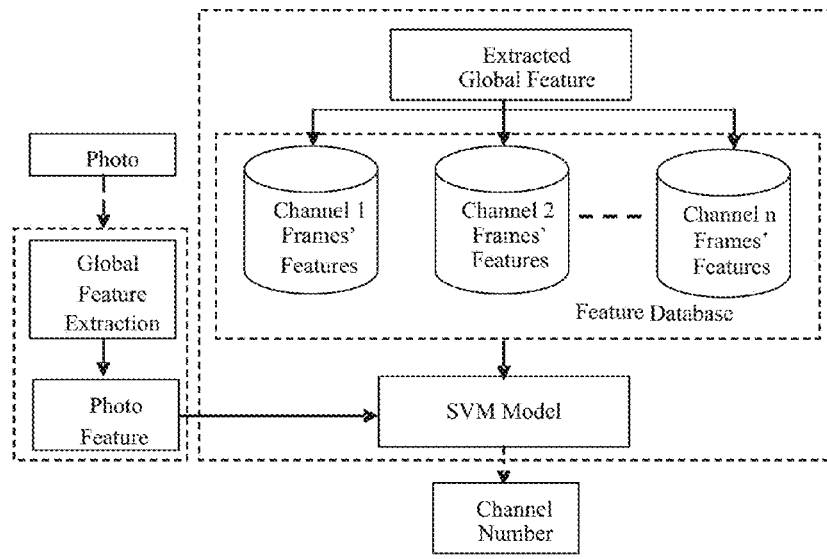
FIG. 10 illustrates an exemplary image classification using global features consistent with the disclosed embodiments.
Figure 11:
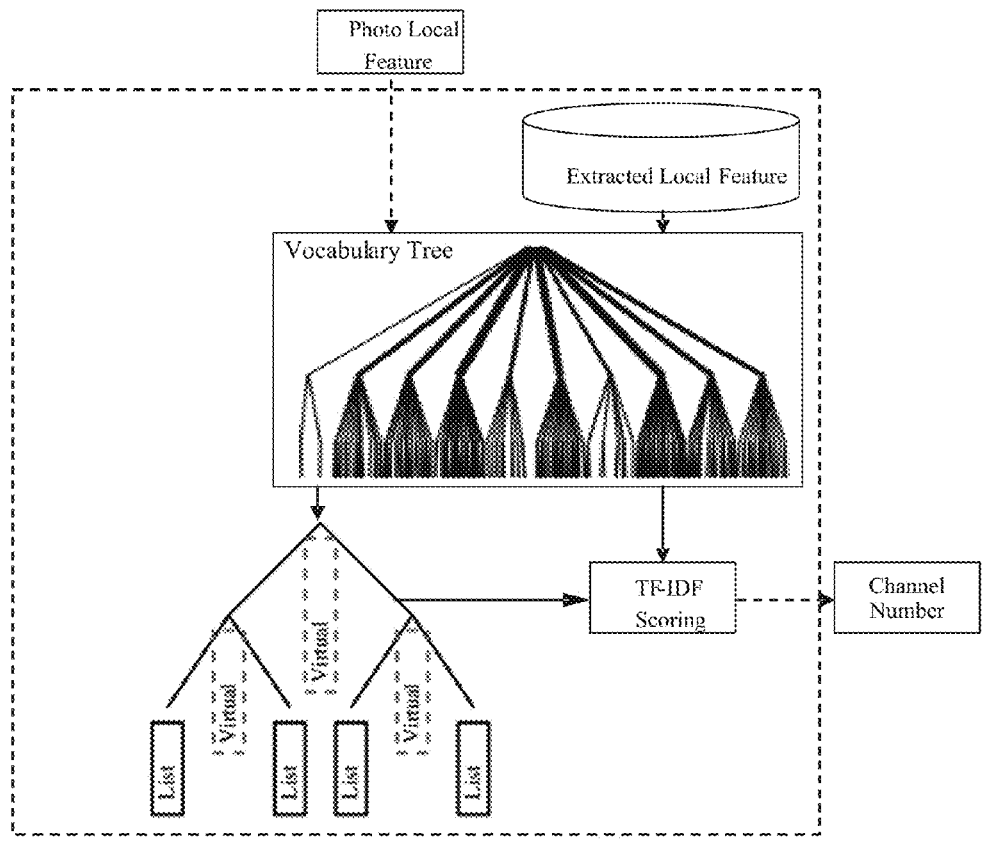
FIG. 11 illustrates an exemplary image classification using local features consistent with the disclosed embodiments.

As shown in FIG. 10, the high-throughput classification use extracted global features of the frames from the plurality channels. Global features may produce compact representations of images, where each image corresponds to a point in a high dimensional feature space. The machine learning of the high-throughput classification may use support vector machine (SVM), which supervised learning model with associated learning algorithms that analyze data and recognize patterns, for classification and regression analysis. In other words, given labeled training data, the algorithm outputs an optimal hyper plane which categorizes new examples.

Typically, supervised learning has a training stage. In the training stage, after feature extraction, all the frame features from one channel are grouped as a class $\{C1, C2, \ldots, Cn\}$, and the SVM multi-classifier is trained. In operation, the global image/photo features uploaded from the mobile device directly go to the trained SVM multi-classifier, which finally determines the channel number.

As shown in FIG. 10, the low-throughput classification use local features, which are descriptors of local image neighborhoods computed at multiple interest points. Typically, interest points are detected at multiple scales and are expected to be repeatable across different views of an object. For example, certain feature types, such as the Scale-Invariant Feature Transform (SIFT) and Speeded-Up Robust Features (SURF), may be used.

Descriptors extracted from local affine invariant regions may be quantized into visual words, which are defined by vocabulary tree that is built by hierarchical k-means clustering. A large set of representative descriptor vectors are used in the unsupervised training of the tree. The collections of visual words are used in Term Frequency Inverse Document Frequency (TF-IDF) scoring of the relevance of an image to the query. Every node in the vocabulary tree is associated with an inverted file, such that large databases can be scored efficiently.

Returning to FIG. 5, after the image classification operation, the determined channel number is provided to the mobile device 104 (S514). The channel number is also feedback to the adaptive controller for flow control operations, and a balance between computation amount and accuracy.

Figure 12:
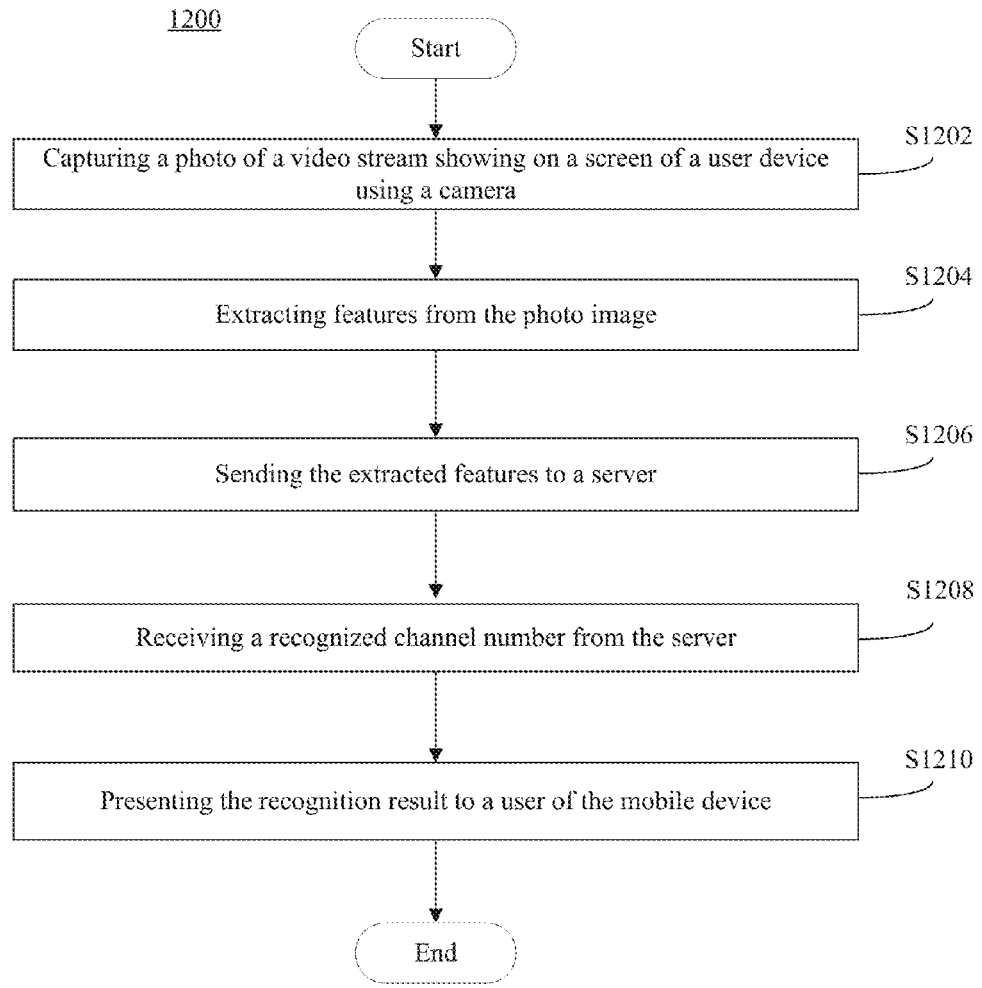
FIG. 12 illustrates an exemplary operating process of a mobile device consistent with the disclosed embodiments.

Correspondingly, FIG. 12 illustrates an exemplary operation process 1200 for the mobile device 104. The mobile device 104 may be connected with server 108. As shown in FIG. 12, at the beginning, the mobile device may capture a photo of a video stream showing on a screen of a user device using a camera (S1202).

Further, the mobile device may extract features from the photo image (S1204). The mobile device may extract global features and/or local features of the image. Further, the mobile terminal may send the extracted features to the server (S1206).

The mobile device may send both global features and local features to the server (e.g., the image classifier of the server). Alternatively, the mobile terminal may receive an instruction from the server and send global features only, local features only, or global features and local features based on the instruction, such that flow control in the image classifier may be performed.

Further, as explained above, the server may perform a video program recognition process to recognize a channel number for the photo image sent by the mobile device, and the mobile device may receive the recognized channel number from the server (S1208). The channel number indicates that the video stream showing on the screen of the user device is from the channel with the channel number.

Further, the mobile device may present the recognition result to a user of the mobile device (S1210). For example, the mobile device may show the recognized channel number to the user and may further ask the user whether a particular action needs to be taken. In certain embodiments, the user may request the same video from that channel number to be played back on the mobile device. The mobile device may also present the result to another software program for further processing. Other actions may also be performed.

Thus, by using the disclosed systems and methods, a computational adaptive video recognition application can be implemented, enabling dynamically selection of a list of reference images for channel detection. A camera registration mechanism can be included to automatically detect the camera take of the current video frame in each channel, thus the images similar to the reference image with a same camera take can be discard from further processing, reducing the size of list of reference images significantly. The decision of frame dropping is controlled by an adaptive controller that maintains the flow throughput to meet the computation capability of the image recognition process, but also maintains the recognition accuracy. To secure a high accuracy of recognition, a user behavior adaptation model can be applied to adjust the reference image list according to the users currently favored channels. In order to maintain flow from the high-throughput source to the low-throughput destiny, specially-designed flow control mechanism can be used the camera registration, adaptive controller, and feature extraction modules.

The disclosed systems and methods may also be used to other multi-screen applications enabling the real-time recognition of a TV program with time-shift feature. Other applications, advantages, alternations, modifications, or equivalents to the disclosed embodiments are obvious to those skilled in the art.

What is claimed is:

1. A method for video program recognition on a server system, comprising:
   recording, by the server system, video sequences of each of a plurality of channels, wherein the video sequences of each of the plurality of channels are formed by interleaved segments of camera takes filmed with a plurality of original camera setups, and a camera take is a series of frames filmed with one camera setup;
   performing, by the server system, a camera registration operation on the video sequences of each of the plurality of channels to select a plurality of video frames representing the recorded video sequences of each of the plurality of channels based on key video frames from a plurality of registered cameras associated with the recorded video sequences;
   extracting features of at least some of the selected plurality of video frames of each of the plurality of channels;
   storing the extracted features of each of the plurality of channels;
   obtaining a set of features of an image captured by a first user device of a video frame from one of the plurality of channels and played on a second user device different from the first user device;
   comparing the obtained set of features of the image with the stored features of each of the plurality of channels using an image classifier to determine whether there is a match between the obtained set of features of the image and features of a video frame from a specific channel; and
   when there is a match between the obtained set of features of the image and features of a video frame from a specific channel, determining a channel number of the specific channel as a recognized channel number;
   wherein performing the camera registration operation further includes:
      detecting camera takes in the recorded video sequences of each of the plurality of channels such that the recorded video sequences are separated into a number of sequences with each corresponding to a registered camera that is aligned to one of the plurality of the original camera setups;

forming a registered camera pool of camera takes for the detected camera takes for each of the plurality of channels;
calculating frame difference between consecutive frames using one of a plurality of algorithms;
detecting a new video shot when the frame difference is above a preset threshold value;
selecting a key frame to represent visual content of each detected video shot;
matching the key frame with a last shot of each registered camera based on a matching criterion, wherein when a registered camera is initially detected, a first shot is used as the last shot of the registered camera; and
when the matching criterion is satisfied, adding the key frame to an end of the matching camera take.

2. The method according to claim 1, wherein:
the first user device is a mobile device and the mobile device captures the image by a camera.

3. The method according to claim 2, wherein:
the second user device is a TV; and
the TV and the mobile device are associated with one or more multi-screen applications.

4. The method according to claim 2, wherein:
the mobile device extracts the set of features of the image in same manner as the features of the selected plurality of video frames of each of the plurality of channels are extracted.

5. The method according to claim 1, further including:
performing an adaptive flow control operation to adjust a throughput of selected plurality of frames from the camera registration operation to match a throughput of extracting features of each of the plurality of channels.

6. The method according to claim 5, wherein performing the adaptive flow control operation further includes:
calculating a ranking score of a video frame of a channel outputted from the camera registration operation based on at least according to a priority of selection of the channel based on user inquiry and a similarity score between the video frame and a last selected frame of a corresponding camera take; and
during the adaptive flow control operation, selecting a video frame with a highest ranking score for feature extraction.

7. The method according to claim 5, wherein:
the extracted features of the plurality of video frames includes global features describing an entire frame image and local features using descriptors of local image neighborhoods computed at multiple interest points.

8. The method according to claim 7, wherein comparing the obtained set of features of the image with the stored features of each of the plurality of channels further includes:
under a processing congestion condition, comparing the obtained set of features of the image with the stored features of each of the plurality of channels using the global features; and
under a processing non-congestion condition, comparing the obtained set of features of the image with the stored features of each of the plurality of channels using the local features.

9. The method according to claim 1, wherein performing the camera registration operation further includes:
when no matched image is added to a camera take for a preconfigured time period, removing the camera take from the registered camera pool.

10. The method according to claim 6, wherein:
when a time period that the channel has no new frame selection is less than a preset threshold, the ranking score of the video frame is calculated according to number of inquiries of the channel and the similarity score between the video frame and the last selected frame of the corresponding camera take;
when the last selected frame of the corresponding camera take does not exist, the similarity score is zero; and
when a time period that the channel has no new frame selection is greater than a preset threshold, the ranking score of the video frame is a constant.

11. A video program recognition system, comprising:
a recorder configured to record video sequences of each of a plurality of channels, wherein the video sequences of each of the plurality of channels are formed by interleaved segments of camera takes filmed with a plurality of original camera setups, and a camera take is a series of frames filmed with one camera setup;
a server having one or more processors configured to:
obtain a set of features of an image captured by a first user device of a video frame from one of the plurality of channels and played on a second user device different from the first user device, wherein the first user device includes a communication module configured to transmit the set of features of the image captured by the first user device to the server;
perform a camera registration operation on the video sequences of each of the plurality of channels to select a plurality of video frames representing the recorded video sequences of each of the plurality of channels based on key video frames from a plurality of registered cameras associated with the recorded video sequences from the recorder; and
extract features of at least some of the selected plurality of video frames of each of the plurality of channels; and
a feature database configured to store the extracted features of each of the plurality of channels from the server,
wherein the server is further configured to:
compare the obtained set of features of the image with the stored features of each of the plurality of channels to determine whether there is a match between the obtained set of features of the image and features of a video frame from a specific channel; and
when there is a match between the obtained set of features of the image and features of a video frame from a specific channel, determine a channel number of the specific channel as a recognized channel number;
and wherein, to perform the camera registration operation, the server is further configured to:
detect camera takes in the recorded video sequences of each of the plurality of channels such that the recorded video sequences are separated into a number of sequences with each corresponding to a registered camera that is aligned to one of the plurality of the original camera setups;
form a registered camera pool of camera takes for the detected camera takes for each of the plurality of channels;
calculate frame difference between consecutive frames using one of a plurality of algorithms;
detect a new video shot when the frame difference is above a preset threshold value;
select a key frame to represent visual content of each detected video shot;

match the key frame with a last shot of each registered camera based on a matching criterion, wherein when a registered camera is initially detected, a first shot is used as the last shot of the registered camera; and when the matching criterion is satisfied, add the key frame to an end of the matching camera take.

12. The video program recognition according to claim 11, wherein:

the first user device is a mobile device and the mobile device captures the image by a camera.

13. The video program recognition according to claim 12, wherein:

the second user device is a TV; and the TV and the mobile device are associated with one or more multi-screen applications.

14. The video program recognition according to claim 12, wherein:

the server extracts the features of the selected plurality of video frames of each of the plurality of channels in same manner as the mobile device extracts the set of features of the image.

15. The video program recognition according to claim 11, wherein the server further includes:

an adaptive controller configured to perform an adaptive flow control operation to adjust a throughput of selected plurality of frames from the camera registration operation to match a throughput of extracting features of each of the plurality of channels.

16. The video program recognition according to claim 15, wherein, to perform the adaptive flow control operation, the adaptive controller is further configured to:

calculate a ranking score of a video frame of a channel outputted from the camera registration operation based on at least a priority of selection of the channel based on user inquiry and a similarity score between the video frame and a last selected frame of a corresponding camera take.

17. The video program recognition according to claim 15, wherein:

the extracted features of the plurality of video frames includes global features describing an entire frame image and local features using descriptors of local image neighborhoods computed at multiple interest points.

18. The video program recognition according to claim 17, wherein the server is further configured to:

under a processing congestion condition, compare the obtained set of features of the image with the stored features of each of the plurality of channels using the global features; and under a processing non-congestion condition, compare the obtained set of features of the image with the stored features of each of the plurality of channels using the local features.

* * * * *